United States Patent [19]

Tiberio

[11] Patent Number: 4,756,594
[45] Date of Patent: Jul. 12, 1988

[54] OPTIC FIBER INTERCONNECTION SYSTEM

[76] Inventor: Joseph W. Tiberio, Ash La., Sherborn, Mass. 01770

[21] Appl. No.: 377,833

[22] Filed: May 13, 1982

[51] Int. Cl.[4] .............................................. G02B 6/38
[52] U.S. Cl. .................... 350/96.21; 350/96.22
[58] Field of Search .............. 350/96.16, 96.21, 96.22; 361/332

[56] References Cited

U.S. PATENT DOCUMENTS

| | | | |
|---|---|---|---|
| 4,025,824 | 5/1977 | Cheatham | 361/332 |
| 4,192,575 | 3/1980 | Hodge | 350/96.21 |
| 4,291,943 | 9/1981 | Binek et al. | 350/96.22 |
| 4,379,614 | 4/1983 | Liertz | 350/96.21 |

FOREIGN PATENT DOCUMENTS

| | | | |
|---|---|---|---|
| 2930831 | 3/1981 | Fed. Rep. of Germany | 350/96.22 |
| 2034496 | 6/1980 | United Kingdom | 350/96.21 |

Primary Examiner—William L. Sikes
Assistant Examiner—Akm E. Ullah
Attorney, Agent, or Firm—John E. Toupal; Harold G. Jarcho

[57] ABSTRACT

An optic fiber interconnection system including a plurality of composite fiber elements extending through openings in a housing and having end portions therein, each of said element end portions consisting of a jacketed optic fiber portion and a rigid protective shield member disposed between the optic fiber and the jacket. A holder mechanism retains the end portions of the optic fibers by clamping the jackets to the shield members and a base support means secured within the housing comprises a clamp assembly that retains the holder mechanism so as to prevent movement thereof.

11 Claims, 1 Drawing Sheet

OPTIC FIBER INTERCONNECTION SYSTEM

BACKGROUND OF THE INVENTION

This invention relates generally to junction box apparatus and, more particularly, to junction box apparatus for use in interconnecting optic fibers used in optical transmission systems.

For practical reasons the maximum lengths of optic fibers are generally limited to about one kilometer. Consequently, many field interconnections are required in typical optical transmission systems. Usually such interconnections are made in junction boxes mounted in suitable field locations. The interconnected cables preferably are held by clamping arrangements that retain and position individual cables in a spaced apart relationship within the junction box. However, the clamping arrangement employed must not damage the highly brittle optic fibers.

The prior art includes a wide variety of clips, hooks and hangers designed for securing elongated members such as cables, wires, pipes, and conduits to various types of structures. Generally, such retaining systems either fail to provide for accurate spacing and separation of a plurality of elongated members or exert thereon a clamping force that can damage brittle elements. Although junction boxes exhibiting those features have been developed for optical transmission systems, they have required either cumbersome and time-consuming manipulations during interconnection operations or relatively intricate machined parts that contribute substantially to the overall cost of the system installations.

The object of this invention, therefore, is to provide an improved, relatively inexpensive junction box for retaining interconnected optic fibers of an optical transmission system.

SUMMARY OF THE INVENTION

The invention is an optic fiber interconnection system including a housing with openings for receiving the ends of composite fiber elements each consisting of a jacketed optic fiber portion and a rigid protective shield member disposed between the optic fiber and the jacket. A holder mechanism retains the ends of the optic fibers by clamping the jackets to the shield members and a base support means secured within the housing comprises a clamp assembly that retains the holder mechanism so as to prevent movement thereof. This arrangement provides a junction box in which a plurality of optic fibers can be safely and easily separated, positioned and interconnected.

According to one feature of the invention, the holder mechanism comprises a plurality of individual holder members each retaining a different one of the optic fiber elements and the clamp assembly comprises a stamping having a plurality of pairs of spaced apart ears, each pair bent into engagement with a different one of the holder members so as to prevent movement thereof. The use of individual holder members retained by a base stamping provides the above-noted features in a relatively inexpensive combination.

According to another feature of the invention, the shield members are rigid cylindrical sleeves, the holder members comprise an annular portion encircling the associated optic fiber covering sleeve and a lateral portion extending transversely therefrom, and the stamping defines a plurality of slots each receiving and engaging the lateral portion on a different one of the holder members so as to prevent axial movement thereof. Preferably, the annular portions comprise hollow cylinders and the lateral portions are annular shoulder flanges at one end thereof. The slots in the stamping provide in a simple configuration accurate positioning of the individual holder members.

According to a further feature of the invention, the stamping retains the optic fibers in a parallel array and the pairs of ears engaging adjacent holder members are spaced apart in directions both axial and transverse to the parallel fibers. This structural arrangement facilitates a use of minimum spacings between the adjacent fiber elements in an array.

According to still another feature of the invention, the housing defines the openings at opposite ends thereof and the base support means comprises a pair of stampings one located adjacent each of the openings. In this desirable configuration, separate bundles of optic fibers conveniently enter opposite ends of the housing for interconnection therein.

According to yet another feature of the invention, each of the stampings defines a plurality of parallel channels for receiving the optic fibers, each pair of ears is formed by cutaway portions on opposite sides of each channel, and the holder receiving slots are arcuately shaped slots formed in a transverse direction to the parallel channels. This arrangement facilitates fabrication of the base support elements as inexpensive stampings.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
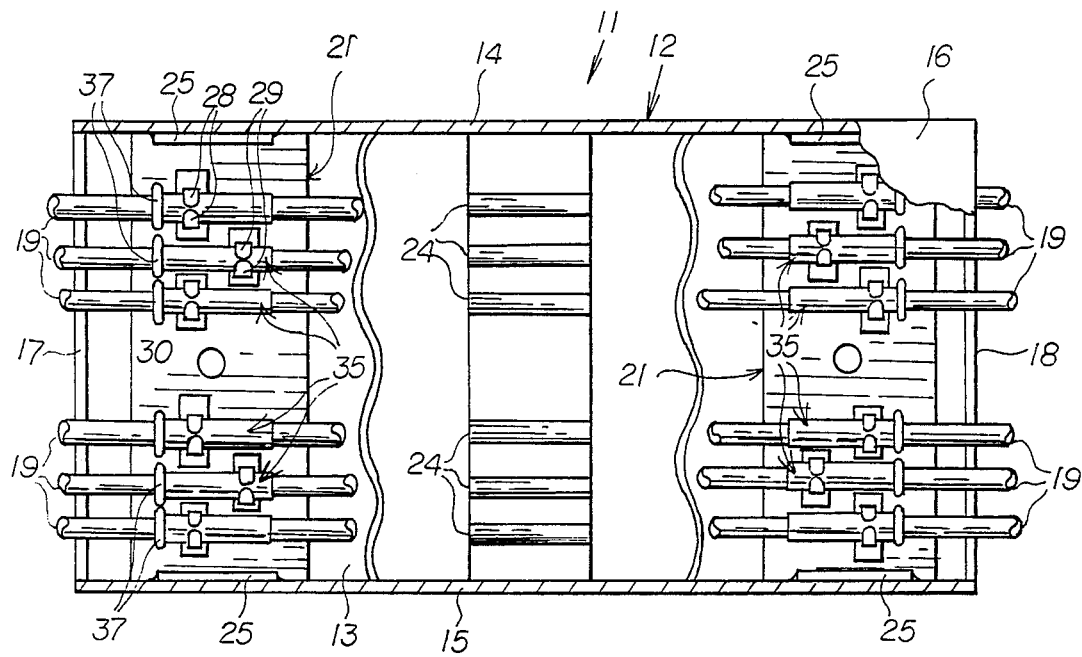
FIG. 1 is a schematic plan view of the invention.

Illustrated in FIG. 1 is an interconnection portion 11 of an optical transmission system. A junction box housing 12 includes a bottom wall 13, side walls 14, 15 and a cover 16. Opposite ends of the box 12 define openings 17 and 18 for receiving mounting portions of composite fiber element 19 used in the optical transmission system. A base support element 21 is fixed, for example by welding to inner surface portions of the junction box 12 directly adjacent to each of the openings 17 and 18. Also retained within the box 12 between the base support elements 21 is a retainer element 22. An upper surface 23 of the retainer element 22 defines a plurality of grooves 24 for receiving and positioning portions of the optic fiber elements 19.

Figure 2:
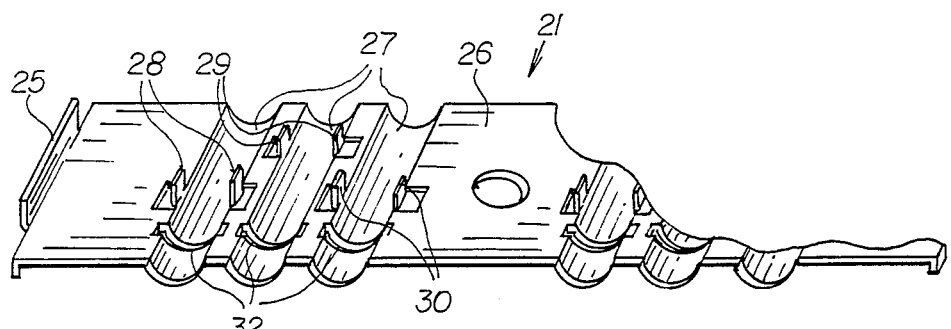
FIG. 2 is a schematic perspective view of a base support shown in FIG. 1.

As clearly shown in FIG. 2, each of the base support elements 21 is a metal stamping having at opposite ends right angle leg portions 25 that attach to the side walls 14 and 15 of the junction box 12. Formed in an upper surface 26 of the elongated support elements 21 are a plurality of parallel channels 27. Each of the channels 27 in the support elements 21 at both ends of the junction box 12 is adapted to receive one of a parallel array of the optic fiber elements 19, and four such optic fiber elements arrays 19 are depicted in FIG. 1. Formed by cutaway portions on opposite sides of each of the channels 27 are pairs of ears 28–30. As shown, adjacent pairs of ears 28, 29, 30 are spaced apart in directions both axial and transverse to the axes of the parallel channels 27. Also formed in each of the support elements 21 in laterally aligned positions in each of the parallel channels 27 are arcuately shaped slots 32.

Figure 3:
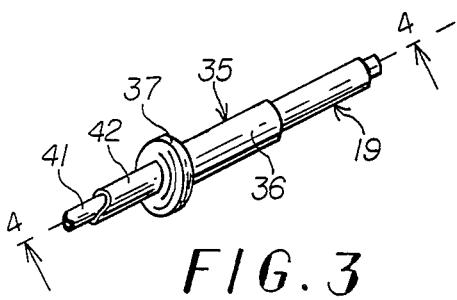
FIG. 3 is a schematic perspective view of an optic fiber and holder member shown in FIG. 1.
Figure 4:
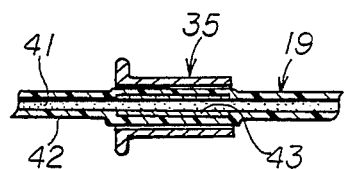
FIG. 4 is a schematic cross-sectional view taken along lines 4—4 of FIG. 3.

Referring now to FIGS. 3 and 4, there is shown in greater detail the end portions of one of the fiber elements 19 and a holder member 35 therefor. As shown in FIG. 4, each element end portion 19 consists of an end portion of optic fiber 41, a jacket 42 therefor, and a rigid shielding sleeve 43 therebetween. Preferably, the jacket 42 is formed from a suitable flexible material such as Nylon and the sleeve is formed of a suitable rigid material such as stainless steel. Each of the holder members 35 includes a hollow cylindrical portion 36 that encircles one of the sleeves 43. Extending laterally outwardly from one end of each holder member 35 is an annular shoulder flange portion 37. During assembly, hollow cylindrical portions 36 are crimped so as to clamp the jackets 42 against the sleeves 43 and thereby securely retain the optic fibers 41.

During use of the system 11, the cover 16 is removed from the junction box 12 so as to provide access to the interior thereof. Appropriate interconnections are then made between the optic fibers 41 entering the openings 17 and 18 at opposite ends of the box 12. Typically, the optic fibers 41 are joined by a fusion arc process. Each of the fiber-retaining holders 35 is positioned in one of the parallel channels 27 in each of the supports 21 as shown in FIG. 1. Entry of the holder elements 35 into the channels 27 is permitted by the ears 28–30 which are then substantially vertical as shown in FIG. 2. Each of the holder elements 35 is positioned in a channel 27 such that its shoulder flange portion 37 enters and is restrained by the arcuate slot 32 therein. The holder members 35 and retained fibers 41 are thus restrained and positioned with respect to movement in an axial direction. Lateral restraint of the holder members 35 and retained fiber end portions 41 with respect to the base support elements 21 is then provided by bending each of the ear pairs 28–30 into engagement with the cylindrical portion 36 of an associated holder 35. Ears bent in this manner are illustrated on the support elements 21 located in the junction box 12 in FIG. 1. Because of the protective sleeves 43, the optic fibers 41 are not damaged during this clamping procedure and all of the components employed are relatively inexpensive stamped parts.

Obviously, many modifications and variations of the present invention are possible in light of the above teachings. It is to be understood, therefore, that the invention can be practiced otherwise than as specifically described.

What is claimed is:
1. An optic fiber interconnection system comprising:
a housing defining openings for receiving the ends of optic fibers;
a plurality of composite fiber elements extending through said openings and having mounting portions within said housing, each of said fiber element mounting portions comprising an optic fiber portion, a flexible jacket covering said optic fiber portion, and a rigid protective shield means disposed between said optic fiber portion and said jacket;
a plurality of holder members each retaining a different one of said fiber element mounting portions and shaped and arranged to retain said mounting element portion by clamping said jacket thereof to said shield means, each of said holder members comprising an annular portion encircling one of said fiber element portions and a transversely extending lateral portion and ends of said optic fiber portions extending beyond said holder members and adapted for connection to other optic fiber portions; and
base support means secured within said housing and retaining said fiber element portions in a parallel array, said base support means comprising a stamping defining a plurality of slots each receiving and engaging said lateral portion on a different one of said holder members so as to prevent axial movement thereof, said stamping further defining a plurality of pairs of spaced apart ears each pair bent into engagement with a different one of said holder members so as to prevent transverse movement thereof, and wherein said pairs of ears are spaced apart in directions both axial and transverse to said parallel fiber element portions.

2. A system according to claim 1 wherein each of said annular portions comprises a hollow cylinder and said lateral portion comprises an annular shoulder at one end thereof.

3. A system according to claim 2 wherein each said shield means comprises a rigid sleeve disposed between each of said fiber portions and said jacket therefor.

4. A system according to claim 3 wherein each of said stampings defines a plurality of parallel channels for receiving said fiber elements.

5. A system according to claim 4 wherein said channels conform to said cylindrical portions of said holder members.

6. A system according to claim 5 wherein said slots are arcuately shaped slots formed in and transverse to said channels.

7. A system according to claim 6 wherein each of said slots is axially spaced from said pair of ears associated therewith.

8. A system according to claim 7 wherein said slots in each of said stampings are aligned in a direction lateral to said parallel channels.

9. A system according to claim 8 wherein said pair of ears are formed by cutaway portions on opposite sides of each of said channels.

10. A system according to claim 1 wherein said housing defines said openings at opposite ends thereof, and said base support means comprises a pair of base supports one located adjacent to each of said openings and said ends of said optic fiber portions retained by one of said base supports are joined to said ends of said optic fiber portions retained by the other of said base supports, said joints of said optic fiber portions being disposed in a region of said housing means between said base supports.

11. A system according to claim 10 wherein each of said annular portions comprises a hollow cylinder and said lateral portion comprises an annular shoulder at one end thereof.

* * * * *